A. MILLER.
Millstone Driver.

No. 25,028.

Patented Aug. 9, 1859.

UNITED STATES PATENT OFFICE.

ALEXANDER MILLER, OF NEWBERN, NORTH CAROLINA.

DRIVER FOR MILLSTONES.

Specification of Letters Patent No. 25,028, dated August 9, 1859.

*To all whom it may concern:*

Be it known that I, ALEXANDER MILLER, of Newbern, in the county of Craven and State of North Carolina, have invented a new and useful Improvement in Drivers for Millstones; and I do hereby declare that the following is a full, clear, and exact description of the same, reference being had to the annexed drawings, making a part of this specification, in which—

Figure 1:
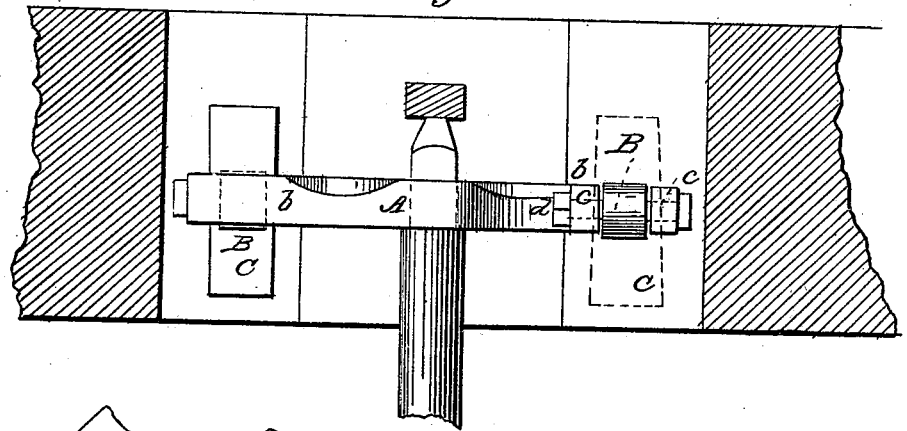
Figure 2:
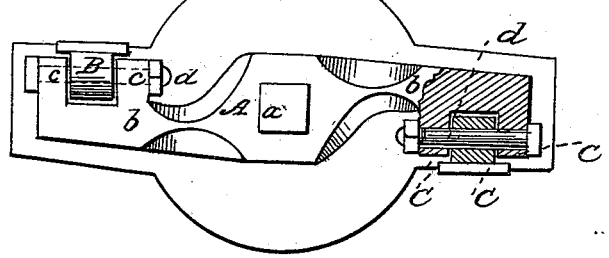

Figure 1, is a side view of my invention. Fig. 2, is a plan or top view of ditto.

Similar letters of reference indicate corresponding parts in the two figures.

The object of this invention is to reduce the friction attending the rotating of the stone by the driver, where the former has a wabbling motion due to an unbalanced state, or to an untrue position of the spindle.

The invention consists in having a friction roller attached to each end of the driver at opposite sides and having steel plates fitted in the eye of the stone to form durable and plane bearing surfaces for the rollers.

To enable those skilled in the art to fully understand and construct my invention I will proceed to describe it.

A, represents the driver of a mill stone. This driver resembles in form those in ordinary use, it being provided with a square opening $a$, in order that it may be fitted on its spindle and provided with two arms $b$, $b$, which fit in recesses made into the stone adjoining the eye. The ends of the driver at opposite sides are provided each with two lugs or ears $c$, $c$, which form bearings for shafts $d$, $d$, on which friction rollers B, are placed, one at each shaft. The shafts $d$, are stationary, the rollers B, being fitted loosely thereon between the lugs or ears.

In each recess of the stone there is a metal plate C, fitted. These plates may be of steel or other hard metal and they are fitted directly in front of each roller B, so as to form bearing surfaces for the same. The rollers B, are of metal, any proper kind being used.

From the above description it will be seen that if the stone revolves with a wabbling motion, the plates C, C, will move up and down in front of the rollers B, and prevent the great amount of friction hitherto attending the rubbing of the stone over the ends of the arms of the driver. The invention also enables a stone to readily restore itself to its proper position if thrown out of true and any inequalities attending the working of the stone will be productive of less friction than hitherto.

Having thus described my invention what I claim as new and desire to secure by Letters Patent, is,

The employment or use of the friction rollers B, B, applied to the driver A, in connection with the plates C, C, or their equivalents fitted in the recesses adjoining the eye of the stone or runner for the purpose of forming proper bearing surfaces for the rollers, the whole being arranged substantially as and for the purpose set forth.

ALEXANDER MILLER.

Witnesses:
C. B. GLOVER,
JOHN HUTCHINSON.